June 17, 1969  A. WESTERSTEN  3,449,951
FLOWMETER
Filed Sept. 8, 1966

INVENTOR.
ALLAN WESTERSTEN
BY
Kendrick, Subkow & Stolzy
ATTORNEYS

United States Patent Office 3,449,951
Patented June 17, 1969

3,449,951
FLOWMETER
Allan Westersten, Venice, Calif., assignor to Statham Instruments, Inc., Los Angeles, Calif., a corporation of California
Filed Sept. 8, 1966, Ser. No. 578,089
Int. Cl. G01f 1/00
U.S. Cl. 73—194
14 Claims

ABSTRACT OF THE DISCLOSURE

A flowmeter operating on the Faraday principle is subjected to a magnetic field for inducing a potential difference in the fluid, the measure of which indicates volumetric flow. The magnetic field is generated by a current including a fundamental frequency and a third harmonic frequency, with sampling of the output voltages made at the peak voltage time for both the fundamental and harmonic voltages. Electrodes in contact with the fluid being measured are electrically related via variable resistances to electrically simulated measurement of isopotential loops for eliminating eddy current artifacts. A further aspect is the provision of a servosystem for automatically varying the resistances for removing eddy current artifacts.

---

This invention relates to flowsensors and flowmeters based on the Faraday principle. Such flowsensors are well known, and read-out circuits which are combined with such flowsensors to indicate a volumetric rate of flow are also well known. In such flowmeters, a voltage is induced between two circumferentially spaced electrodes, usually diametrically opposed, in a flow channel in which fluid flows in a direction which is transverse to the electrode spacing and in which the lines of force of a magnetic field are transverse (for example, perpendicular) to the direction of the flow of the fluid and to the electrode spacing.

The aim of such systems is to produce a voltage which is a faithful reflection of the volumetric flow rate in the meter. The accuracy of the voltage reading is affected by influences which are not proportional to flow rates and, in fact, may have no ascertainable relation to the volumetric flow rate. Such voltages are termed artifact voltages.

Many sources of such artifact voltages have been recognized by the prior art and means for their elimination or ascertainment have been devised. Thus, means for either eliminating the source of these artifact voltages from the output or determining their value and correcting for them have been devised.

One persistent effect of such artifact voltage is the variation in the zero voltage, also known as the base voltage, that is, the voltage of the output which is independent of the flow and which is also present at zero flow. The magnitude of the signal which is related to flow rate, if it be a faithful record of the flow rate, depends on either an ascertainable or stable value of such base or zero voltage. If this base voltage varies in an accidental manner or is not ascertainable, the flow signal is subject to an artifact voltage, and the output voltage cannot be trusted as a measure of flow.

This zero error voltage may arise from many sources. In the case of a high frequency AC flowmeter, the voltage may be due to resistive and capacitative leakages between the magnet coil and the electrodes. This error, however, can be eliminated by careful shielding of the sensor magnet and its leads.

Another source of error arises from the fact that the conductive path between the electrodes and the external leads to the read-out device constitutes a secondary loop in inductive relation to the primary AC magnetic field. This loop is herein referred to as the conductor loop. A voltage is generated in the secondary conductor loop termed a quadrature voltage, which modifies the flow induced voltages. This error has been recognized. Various means have been devised and used for eliminating this voltage, or correcting for it in the read-out circuit, or discriminating against it.

I have found, however, that there is another source of voltage error. This voltage error affects the zero voltage and this is an important source of artifact voltage.

In addition to the potential between the electrodes resulting from the Faraday effect, there are present eddy currents both inside and outside the flow path, termed a lumen, of the flow transducer, i.e., the flow sensor. The external eddy currents are present when the flowmeter is immersed in a conductive medium which surrounds the flow channel through the meter. There are also eddy currents within the lumen.

Any conductive path through the lumen which is completed outside the sensor can be considered to represent a one turn secondary of an imaginary transformer having the sensor magnet coil as the primary. The totality of all the possible current paths is represented by a volume conductor in the form of a donut, where the hole is the lumen in the sensor. A second set of eddy currents circulates inside the lumen in a plane at right angles to the direction of the magnetic field. The phase relationships of these two sets of eddy currents with the magnetic flux are dependent upon the impedance of the fluid medium as well as the leakage inductance of the virtual transformer of which the eddy currents constitute the secondary circuit. This transformer loop is an addition to the quadrature effect of the conductor loop.

I have found that the voltages arising from the eddy currents have a material influence on the electrode voltage and add to the quadrature effect of the conductor loop. Due to the nature of these eddy currents, the error which they introduce is not a constant error, and thus they seriously affect the reliability of the derived flow voltage as a true measure of the flow. It is a necessary requirement that the error introduced by a variation of zero voltage be within acceptable limits and ideally be eliminated. The eddy current error voltage introduces a substantial uncertainty into the value of the Faraday principle flowmeter as a true measure of flow.

Depending upon the nature of the environment, this error, as I have found, may be large. In the case of blood flowmeters, the error may be as high as 50% of the output signal. In the case of a flowmeter used to measure the flow of a medium of substantial electrical resistance, especially where the magnetic field excitation current is at low audio frequency, the resistances of eddy current loops are high compared with the reactance of the loops, and there is a substantially 90° phase difference between the circulating eddy currents and the excitation current for the AC magnetic field.

The error voltage resulting from the inductive coupling of the circulating eddy currents and of the magnetic field is here termed a "transformer voltage."

For purposes of the following discussion, the term "transformer voltage" will be restricted to the effect of the eddy currents, recognizing, however, that the quadrature voltages from the conductor loop are also transformer voltages. There is, however, a significant difference between the voltages resulting from the eddy currents and from the conductor loop.

The transformer voltage resulting from the eddy currents has a component which is in phase or may be 180° out of phase, with the voltages resulting from fluid flow hereinafter referred to as the flow voltage. Both of these latter components, since they affect the flow voltage by algebraic addition, are termed the "in-phase components." In addition, the eddy current voltages have a component which is quadrature with the flow voltages.

The relative magnitudes of the quadrature voltage and the in-phase voltage of the eddy currents depend on the impedance of the conducting medium and the geometry of the flow transducer, which determines the magnitude of the leakage inductance. I have found that the quadrature voltage arising from the eddy currents may be eliminated as an influence on the flow voltage by means similar to that used in the prior art or in my copending application, Ser. No. 305,090, filed Aug. 28, 1963, now Patent No. 3,316,762, to eliminate or correct for the quadrature voltage arising from the conductor loop.

By employing a sampling gate to sample the developed electrode voltage at a time interval centered at the time of a maximum rate of change of the quadrature voltage, such that the integrated value of the quadrature component is zero, the sample voltage will contain only the flow signal and the in-phase voltage arising from the eddy currents.

I have discovered that the in-phase component of the eddy current arises from the lack of symmetry in the system. In order for the electrodes to sense a difference of potential arising from the eddy current circulating between the electrodes, the electrodes must intersect different isopotential loops. Only if the electrodes intersect equivalent isopotential loops will there be no error voltage arising from the circulating eddy currents. Such a result requires a condition of mechanical and operational symmetry which in practice cannot be continuously maintained in the flow transducers of the prior art operating on the Faraday principle.

Even if the system be of ideal mechanical symmetry, variation in the vessel and the flow could prevent an invariant ideal condition. The position of the eddy current loops shifts; and even if, under test conditions, such a symmetry has been obtained, it would be destroyed as the eddy current loops change their position and the electrode no longer intersect equivalent isopotential loops.

It is an object of my invention to reduce and ideally to eliminate the in-phase component of the transformer voltage by effectively causing the potential difference between the electrodes established at zero flow to be a substantially constant base voltage, and ideally to be absent, and thus to avoid the influence of the artifact voltage arising from the eddy current effect.

This may be achieved by establishing the equivalent of substantially constant isopotential loop conditions between the opposed electrodes. One means to obtain this objective is to move the electrodes until, at zero flow, having removed any quadrature voltage from the signal, the potential between the electrodes is reduced to a practical minimum. Under this condition, electrical symmetry is established. There is no assurance, however, that the symmetry will be maintained under all conditions and all levels of flow when the flow transducer is employed in actual operation. In order to maintain this condition, it will be necessary to interrupt the flow and readjust the position of the electrodes.

I have devised a flow transducer, according to my invention, for electrically obtaining the electrical equivalent of the symmetry required to reduce or ideally to eliminate the effect of the in-phase component of the transformer voltage, as will be more fully described below.

Another aspect of my invention, which has utility when used with other types of Faraday flowsensors and with other types of read-outs, but which I prefer to employ with the flowmeter of my invention, permits of the isolation from the flow signal of the in-phase component. The quadrature component may also be isolated, to develop a flow signal which is substantially free of the artifact voltages.

In addition, according to a preferred embodiment of my invention, the isolated artifact voltage may be used in a form of negative feedback, to suppress and, in practical effect, to eliminate the artifact voltages from the developed signal appearing at the output of the system.

This output, in practical effect, is substantially free of the artifact voltages previously described and is dependent substantially only upon the flow signal.

According to my invention the developed signal is sampled by a sampling gate phased to a time interval which is centered substantially at the times that the quadrature voltages pass through zero.

Thus, the integrated value of the sampled quadrature voltages are substantially zero, and the resultant signal 90° out of phase with the quadrature voltage does not contain the quadrature voltages of the conductor loop and the eddy current loops.

As pointed out above, this will not remove the in-phase component of the flow signal. The quadrature voltages and the in-phase voltage are all proportional to the frequency of the AC magnetic field. The flow signal is independent of the frequency and is proportional to the strength of the magnetic field. By generating the magnetic field by a wave containing multiple frequencies, for example, a fundamental and higher harmonics, the generated voltage will be an AC voltage which is a combination of these multiple voltage waves.

For example, if the energizing AC has a higher harmonic superimposed upon a fundamental frequency, we will obtain a flow signal which will be substantially the same for each frequency, and a quadrature and in-phase voltage, which will be different for the fundamental and the harmonic, being greater for the harmonic.

By sampling the output voltage from the flow transducer at a time interval centered at a time when the rate of change of the fundamental and harmonic flow voltages are both at a minimum, i.e., at peak voltage, the quadrature voltages due to the conductor loop and the eddy currents will not appear in the sample. This is because both the quadrature voltages will pass through zero at the center of the interval, and their integrated value over the entire interval will be substantially zero.

However, the in-phase transformer voltage, if generated by the system, will be present and will appear in the remaining signal. As stated above, the transformer voltage is proportional to the frequency. The flow voltage is proportional to the magnetic field strength and is independent of frequency.

By selecting a gating interval such that the flow voltage due to the harmonic is of a sign opposite to that of the fundamental, the sample taken at this gating interval will not contain a net. As is described below the magnitudes of the field at the fundamental and harmonic frequencies are adjusted so as to accomplish these effects.

Since the in-phase voltage resulting from the harmonic component is opposite in sign to that of the fundamental, and at a higher value, the net signal will be substantially entirely the voltage due to the harmonic in-phase component and will not contain the flow voltage or the quadrature voltage.

I can thus isolate the quadrature voltages and the voltage due to the in-phase component from the flow voltage component of the composite signal. I can separately record these voltages or subtract them from the total voltage signal to obtain the pure flow signal voltage.

This procedure has inherent hazards which may present an error, arising from the fact that the ratio of the quadrature to flow signal components of the fundamental and the harmonics may not be maintained at a fixed ratio at all intervals of time. While it is true that in all events the quadrature voltages and voltages due to the in-phase component, as measured at the electrodes, will go through zero at the same time, the above fixed ratio may not be invariant due to variations in the impedance of the environment.

I have, however, according to my invention avoided this possible source of error and reduced the magnitude and, in practical effect, removed the quadrature and the in-phase component signals from the electrode potential.

As stated above, according to one form of my invention, the quadrature voltage and the in-phase component of the voltage may be reduced to a practically negligible value by creating a condition of electrical symmetry at the electrodes by adjusting the electrodes. For many uses, I can employ a movable electrode and movable electrode leads, so that in adjusting the position of the electrode and leads I can find a place where the quadrature and in-phase potentials are reduced to a negligible quantity.

Where this is not practical, as in the case of implanted blood flowmeters or other inaccessible meters, or where adjustment is impractical, I have produced the same effect electrically. Instead of using two electrodes as poles, I employ three electrodes, two of said electrodes being spaced apart on one side of the flow channel and the third electrode being spaced on the opposite side. I connect the electrodes of the pair of electrodes to the ends of a resistance and connect as intermediate tap to the resistance and to the outputs of the flowmeter and the other output connection to the opposed electrode.

By adjusting the position of the tap to a position on the resistor where the in-phase component, separated as stated above, is at a minimum or is not existent, I may effectively remove the in-phase component from the signal. I call such a pair of electrodes and tap a "phantom electrode."

I may, if desired, use conventional means for isolating or subtracting the quadrature component as described above, and I may also employ the conventional techniques in adjusting the leads or employ an auxiliary coil to reduce the magnitude of the quadrature component.

I prefer, however, to employ the means I call the "phantom lead" to obtain this objective.

To one of the electrodes, and not the phantom electrode, I connect both ends of a resistance loop. The wire loop is sandwiched in between the lumen and one pole face of the magnet, rather than circumscribing one pole. By tapping the resistance between its ends and adjusting the position of the tap to a point where the quadrature voltage component, as measured above through the sampling gate, is reduced to a minimum or is removed in substantial effect, the quadrature component may be removed from the signal.

According to the form of my invention, it is necessary to monitor the quadrature isolated as described above. This also applies to the isolation of the in-phase component according to the form of my invention described above. In the above form of my invention this requires a constant adjustment of the taps. To avoid such adjustment, I prefer to employ a servosystem whereby the resistances are automatically adjusted to reduce the quadrature error and the in-phase voltage to negligible quantities.

It is, therefore, an object of my invention to remove the in-phase component of the composite flow signal from the flow signal of a Faraday flowmeter.

It is a further object of my invention to generate the flow signal using an AC magnetic field which contains multiple frequencies.

It is a further object of my invention to establish said magnetic field by means of an AC current of multiple frequencies and to select the frequencies and the voltages associated with said frequencies such that, at a time interval centered at the minimum rate of change of both frequencies, the net current energizing said magnetic field is substantially zero.

It is a further object of my invention to isolate from the output voltages of a Faraday flowmeter the quadrature components associated with said signal.

It is a further object of my invention to isolate the in-phase component associated with the flow signal.

It is a further object of my invention, in its preferred form, to employ a phantom electrode as set forth above.

It is a further object of my invention, in its preferred form, to employ a phantom lead as described above.

It is a further object of a preferred form of my invention to feed back the in-phase component signal to said phantom electrode to reduce the in-phase component error signal to a substantial minimum.

It is a further object of my invention to feed back the quadrature signal to the phantom lead, to reduce the quadrature signal to a substantial minimum.

These and other objects of my invention will be further described in connection with the drawings, of which:

FIG. 3–a is a section on line 3a–3a of FIG. 3;

Figure 1:
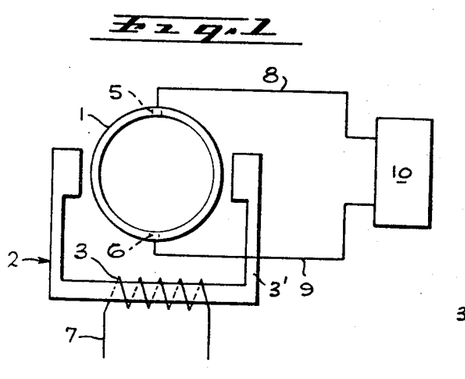
FIG. 1 shows schematically a core type conventional flowmeter operating on the Faraday principle, i.e., a Faraday flowmeter.
Figure 2:
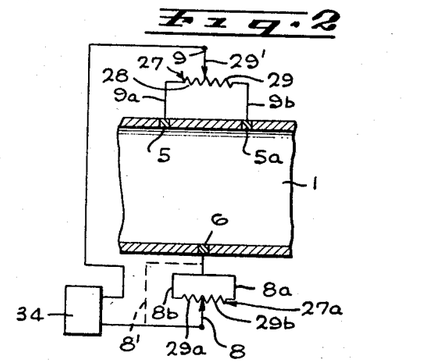
FIG. 2 shows schematically my improved Faraday flowmeter employing both a phantom electrode and a phantom lead.
Figure 3:
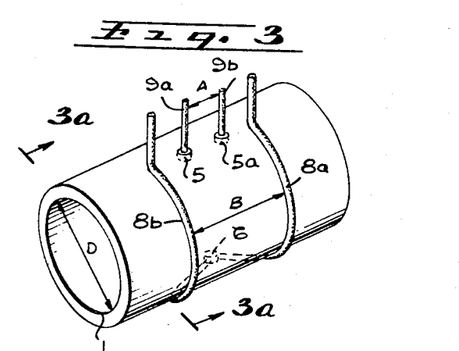
FIG. 3 is a perspective view of the flowmeter of FIG. 2, showing the preferred arrangement of the leads.

In FIGS. 1, 2, 3, 3–a, 4 and 5 the flow tube 1 through which the fluid flow is to be measured, known as the lumen, is contained between the poles of a magnet 2 carrying an excitation coil 3 excited (see FIG. 1, FIG. 7) by an AC source 7.

The lumen may be a flow tube through which the fluid is passed or as is usual in blood flowmeters, it is a casing which surrounds the artery. Such construction is well known to those skilled in the art.

In the conventional embodiments the electrodes 5 and 6 in FIG. 1 are spaced diametrically opposite each other and insulated from each other. Usually and preferably the tube 1 is of insulating material, or the electrodes 5 and 6 are insulated from the tube. The electrodes are connected by leads 8 and 9 to read-out system 10. The magnetic field lines of force, direction of flow, and electrode spacing are all mutually perpendicular to each other. A potential is induced between 5 and 6 proportional to the rate of flow and the strength of the magnetic field.

One source of artifact voltage arises from the loop formed by the fluid in the lumen, and the conductor wires. This links the magnetic field and form the secondary of a transformer. This is the quadrature voltage in the conductor loop discussed above. When the flow voltage is low, as in the case of small implant blood flowmeters, this artifact voltage may be very much greater than the flow signal.

The prior art has recognized this error and has devised means for effectively reducing the magnitude of the quadrature voltage and to subtract it from the flow signal.

There are, however, other sources of quadrature voltages arising from the circulating eddy currents through the fluid in the lumen. These form conductor loops which link the magnetic field in the primary coil. They may be of two kinds, one entirely within the lumen 1, and others through the fluid, and the external environment. The latter type is especially apt to occur if the external environment be conductive, as in the case of the implanted blood flowmeters.

Unless the electrodes 5 and 6 intersect the eddy current flow paths at exactly the same potential, a voltage difference is established between the electrodes due to these eddy currents. There are, of course, some positions of the electrodes in which this may not be the case. In one embodiment of my invention I provide means for moving one electrode longitudinally or circumferentially about the lumen to adjust the position of the electrodes with respect to each other. With the flow interrupted, a signal will develop from which the artifact voltages due to eddy currents and the conductor loop may be removed by adjusting the position of the electrodes and the electrode leads to reduce or ideally to bring the remaining signals to zero.

Thus, isopotential positions for the electrodes may be found at zero flow, in which the electrical symmetry of the electrodes is established and the in-phase flow signal arising from the eddy currents eliminated. Such an expedient is no solution for a condition when the flow is resumed, and a second adjustment may be necessary to remove the in-phase component of the flow signal.

Variations in the flow will cause the symmetry to be destroyed and introduce an in-phase component in the flow signal resulting from the asymmetry. In the Faraday flow sensor of my invention I provide means for establishing the electrical equivalent of the isopotential position of the electrodes and thus to minimize and ideally to remove the in-phase component of the flow signal, I obtain this result by employing electrode system referred to above as "phantom electrode."

Figure 3A:
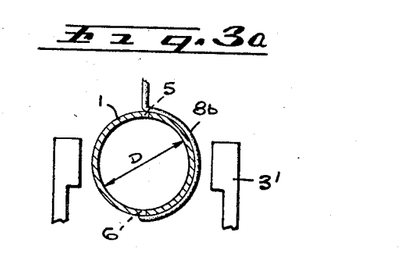

FIGS. 3 and 3a illustrate the phantom lead and phantom electrode in a Faraday flowmeter. Instead of using two opposed electrodes, as in the conventional Faraday flowmeter, I use more than two. This is illustrated in FIG. 3, in which the lumen 1 contains two electrodes 5 and 5a, spaced along the length of the lumen, that is spaced longitudinally in a line substantially parallel to the axis of the lumen and in electrical contact with the fluid in the lumen.

The electrode 6 is in electrical contact with the fluid in the lumen and is spaced diametrically from an intermediate point between 5 and 5a, where the fluid passes through the lumen, the lumen is an insulator, and the electrdoes pass through the lumen and are in electrical contact with the fluid in the lumen, where as for instance in the case of a blood flow meter, the fluid conduit is an artery, it is placed within the lumen and the electrodes make electrical contact with the walls of the artery. A resistor 27 is electrically connected to 5 and 5a with a tap 29' electrically connected at an intermediate point in the resistor 27, to provide two adjustable resistances 28 and 29, whose resistance may be adjusted by moving the tap at 9.

The tap 29' may be connected to an amplifier 34, as will be more fully described below, to which is also connected the electrode 6, directly, as shown by dotted line 8', or through the phantom lead to a conductor 8, described below.

Electrode 6 may be connected by a "phantom lead." Thus two conductors 8a and 8b are each connected to resistors 29a and 29b, which are in turn connected to the tap 8, as in the previous case, and to the amplifier 34. The relative value of the resistances 29a and 29b may be adjusted by moving the tap at 8.

The relative values of the resistances 29a and 29b and 28 and 29 may be adjusted manually by moving the taps on the resistance manually or by a servo link, as will be described below, to suppress the quadrature components by adjustment of the relative value of the resistance of the resistors 29a and 29b. The adjustment of the relative value of the resistances of resistors 28 and 29 will suppress the in-phase component of the flow signal.

I prefer also to reduce the magnitude of the quadrature component of the conductor loop to adjust the position of the conductor leads 8a and 8b connected to the electrode 6, so as to be wound circumambiently about the lumen and to be exterior of the leads 9a and 9b connected to the electrodes 5 and 5a. For optimum suppression of the quadrature component, I prefer to design the arrangement of the leads so that the dimension B, which is the longitudinal separation parallel to the axis of the lumen of the leads 8a and 8b, is related to the dimension A of the leads 9a and 9b, that is the longitudinal separation parallel to the said axis and to the internal diameter of the lumen such that B is substantially and ideally equal to $$D - \frac{D-2}{2}$$

and A is substantially and ideally equal to $$B - \frac{B}{4}$$

where all are in the same units of length.

Figure 4:
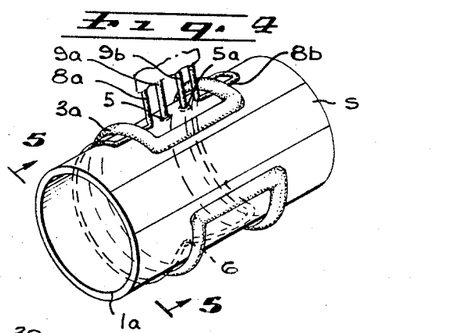
FIG. 4 is a schematic diagram of a coreless single magnetic coil flowmeter to which the phantom electrode and phantom lead may be applied.
Figure 5:
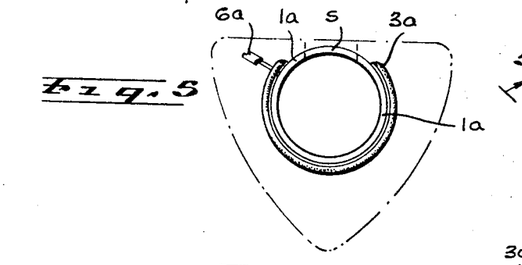
FIG. 5 is a section taken along line 5–5 of FIG. 4.

The form of coreless Faraday flowsensor is of the form described in the article entitled "Single-coil Coreless Electromagnetic Blood-Flowmeters" by A. Kolin and R. Wisshaupt, I.E.E.E. Transactions on Bio-Medical Electronics, vol. BME-10, #2, April 1963, pp. 60–67, to which reference is made. The coil 3a is spaced from the lumen 1a sufficiently to permit the placement of the conductors 8a and 8b between the coil 3a, and the lumen 1a of insulating material. The electrodes 5, 5a and 6 are positioned so that they project through the wall of the lumen 1a to make electrical contact with the fluid in the interior of the lumen. The wires are insulated and may be assembled onto a cable 6a. The lumen is interrupted by a shutter S. The entire assembly is encased in a plastic sheath which also carries the shutter S. By removing the shutter the lumen may be placed about an artery. The shutter may then be replaced.

The electrodes 5 and 5a may be connected to a differential amplifier 30, to be more fully described below, and the resistance 27, connected across the output of the amplifier, as shown in FIG. 2.

The relative values of the resistances 28 and 29 may be adjusted manually by moving the position of the tap on the resistance 27 or by a servo link, as is more fully described below, to suppress the in-phase component.

The resistor 27a is tapped by a tap connected to the conductor lead 8 to form two resistor sections 29a and 29b.

The voltages between 6 and 5 and 6 and 5a, due to the flow voltage are the same. However, unless the electrodes 5 and 5a intersect isopotential regions of the eddy currents, a voltage difference due to such eddy currents will appear between 5 and 5a. Changing the resistances between 5 and 9 and between 5a and 9 is equivalent to moving the phantom electrode along the eddy current path connecting 5 and 5a. It is thus possible to find a position on this path which is equivalent to the one occupied by electrode 6. The required inequality will be that sufficient to cancel out the in-phase component from which this inequality and potential difference between electrodes 5 and 5a arises.

The net current due to the eddy current passing to 8 is thus nulled.

By adjusting the value of the resistances 28 and 29, as will be more fully described below, I may remove the in-phase component of the flow signal, as has been described above and as will be more fully described below.

Because the above adjustments simulate an electrode which intersects the eddy current loop at a potential which is the same as that intersected by 6, I call this device a phantom electrode, since it electrically simulates an electrode adjusted to intersect an isopotential eddy current loop which is equivalent to one intersected by the electrode 6.

Let us assume that the electrode 6 at a given instant has an inphase potential $e$ with reference to some voltage base for example ground. The iso-electric loop with a potential $e$ will lie in a plane containing electrode 6 and intersecting the lumen. The plane may contain 5 or 5a or be positioned anywhere between the two. The electrode 5 with reference to the same potential base will have a potential $e+e_1$, where $e_1$ may be either 0 or some value different from 0 depending on the position of the plane containing the iso-electric loop. If the position of the plane is removed from the position of electrode 5 in a direction which may be arbitrarily designated as positive, $e_1$ will have a positive and finite value. Electrode 5a would then have a potential with reference to the same base of $e-e_2$ since it is displaced from the plane of the iso-electric loop in a direction opposite to the direction of displacement of the electrode 5. If the two electrodes are connected to the opposite end of a potentiometer, such as resistance 27 there is a position along the resistance where the wiper 9 will be at a potential $e$ with reference to the above base.

Figure 6:
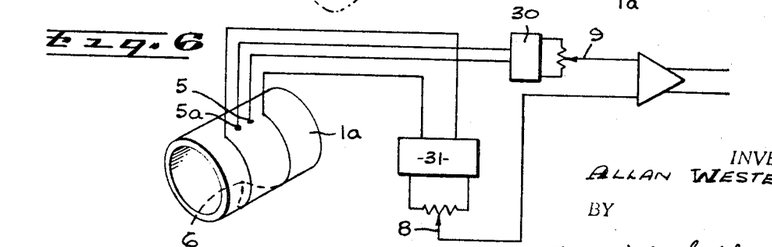
FIG. 6 is a schematic view which illustrates the principles of my invention in a preferred form.

I may also eliminate the quadrature components induced by the conductor loop and by the eddy currents by employing an auxiliary lead, which I term a phantom lead. This may be accomplished by including a loop (see FIGS. 2 and 3) at one point in the loop to electrode 6, and having as a section of the loop a resistor 27a directly connected as in FIG. 2 to the amplifier or connected to the output of the amplifier, as shown in FIGS. 4 and 6, as has been described above and will be more fully described below.

By adjusting the relative values of the resistances 29a and 29b, either manually or by a servo link, as will be more fully described below, the quadrature component be removed in substantial effect from the signal derived from the flowmeter.

The plane passing through the electrode 6, which is parallel to the lines of force of the magnetic field will intersect the lumen between the wires 8a and 8b. Since the plane which includes the conductors 8a and the electrode 6 is displaced with reference to the aforesaid plane, which is parallel to the lines of force, by an angle $(a)$, and since the plane passing through the conductors 8b is displaced from the aforesaid plane, which is parallel to the lines of force, by an angle $(b)$ the quadrature voltage at 8a is opposite in sign to that at 8b. There is therefore a position for the wiper along the resistance 29b where the quadrature voltage is substantially 0.

Figure 7:
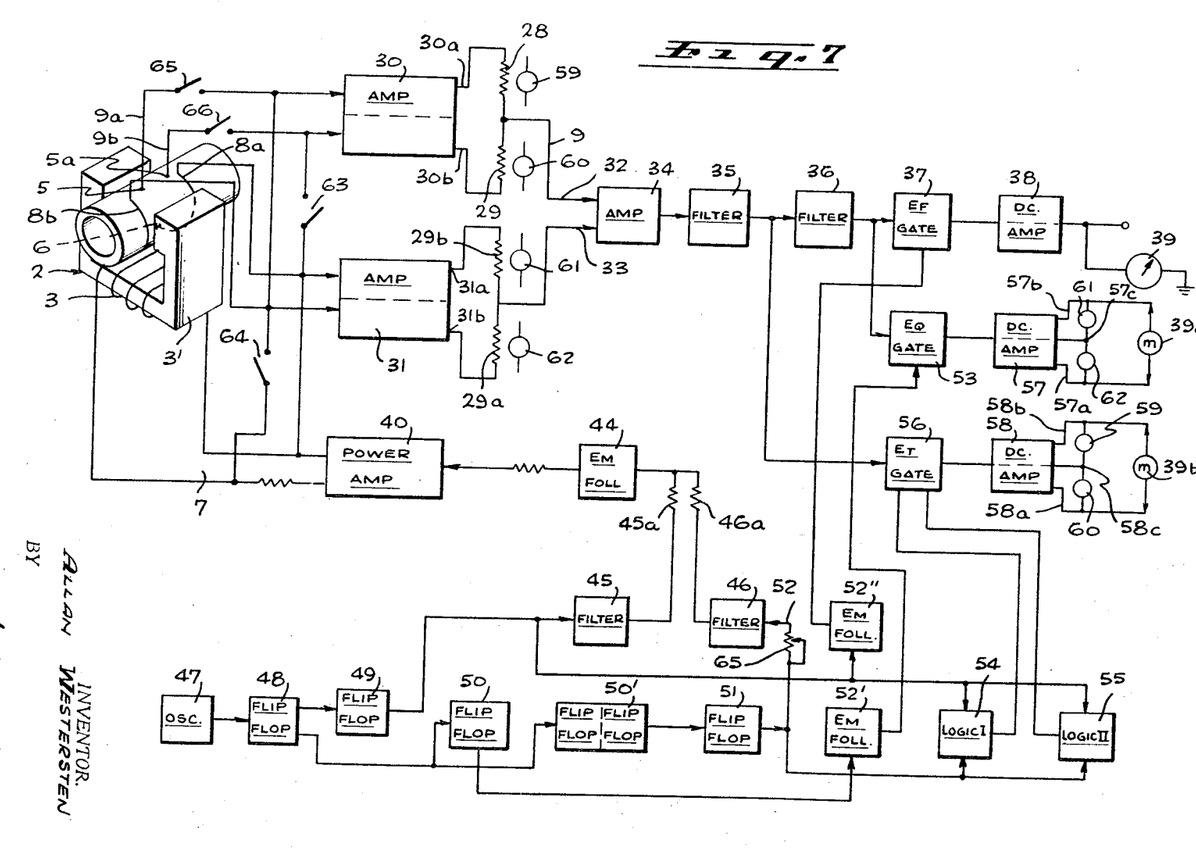
FIG. 7 is a schematic block diagram of a preferred embodiment of a circuit employing my invention.

The circuit illustrated in FIG. 7 shows the adaptation of my invention to a servosystem. However, as will be described below, it may be made open loop so that it is not automatic.

In FIG. 6 the flow transducer, composed of a lumen 1, magnet 2 and coil 3, is the same as that descriebd in connection with FIGS. 2 to 6.

The leads 9a and 9b are connected one each to one input terminal of a differential amplifier 30. The leads 8a and 8b are likewise connected one each to one of the input terminals of the differential amplifier 31.

The output leads of the amplifiers 30 and 31 are connected as shown in FIG. 6. If connected as in FIGS. 2 to 5 and 6, the tap 9 is adjusted on the voltage divider, to adjust the relative resistances 28 and 29; and the tap 8 is adjustable on the voltage divider to adjust the relative resistances of 29a and 29b.

If connected as in FIG. 7, the amplifiers 30 and 31 are differential amplifiers. The resistors 28, 29, 29b and 29a may be raysistors, that is, light-sensitive resistors whose resistance is proportional to the intensity of the light generated by the lamps 59, 60, 61 and 62, respectively. Such resistors are well known and need no further discussion. The output leads 9a and 9b are connected to the input of the amplifier 30. The output leads 8a and 8b are connected to the input of the amplifier 31. One end of resistor 28 is electrically connected to output terminal 30a of the amplifier 30, and one end of the resistor 29 is electrically connected to the output terminal 30b. The ends of the resistors are electrically connected to the conductor 9. The resistor 29b is electrically connected between the output terminal 31a, and the resistor 29a is electrically connected to the output terminal 31b, and the resistors 29a and 29b are electrically connected to each other and the conductor 8. The coil 3 is energized by the power amplifier 40, which generates an AC wave containing a fundamental and a third harmonic, as is described more fully above.

An oscillator 47 generates an AC wave at a frequency of $12f$, and it passes to a bistable flip-flop 48, which converts it into a square wave of half the frequency, i.e., $6f$. The $6f$ frequency from 48 passes to a bistable flip-flop 49, which halves the frequency and delivers a square wave frequency of $3f$. The output of the $6f$ frequency flip-flop 48 passes also to the bistable flip-flop 50, and $6f$ pulses are taken from the other side of the flip-flop to develop a pulse at $3f'$ frequency 90° out of phase with the $3f$ pulse from 49 (see G and H of FIG. 8).

The $6f$ pulses from 48 are introduced into the flip-flop 50' composed of two flip-flops in series with internal feedback, to deliver a $2f$ pulse, i.e., at ⅓ the frequency of the pulses passing from 48. The $2f$ pulse passes to the bistable flip-flop 51, which halves the frequency and delivers an $f$ frequency square wave pulse in phase with the $3f$ pulse from 49 (see I of FIG. 8).

Figure 8:
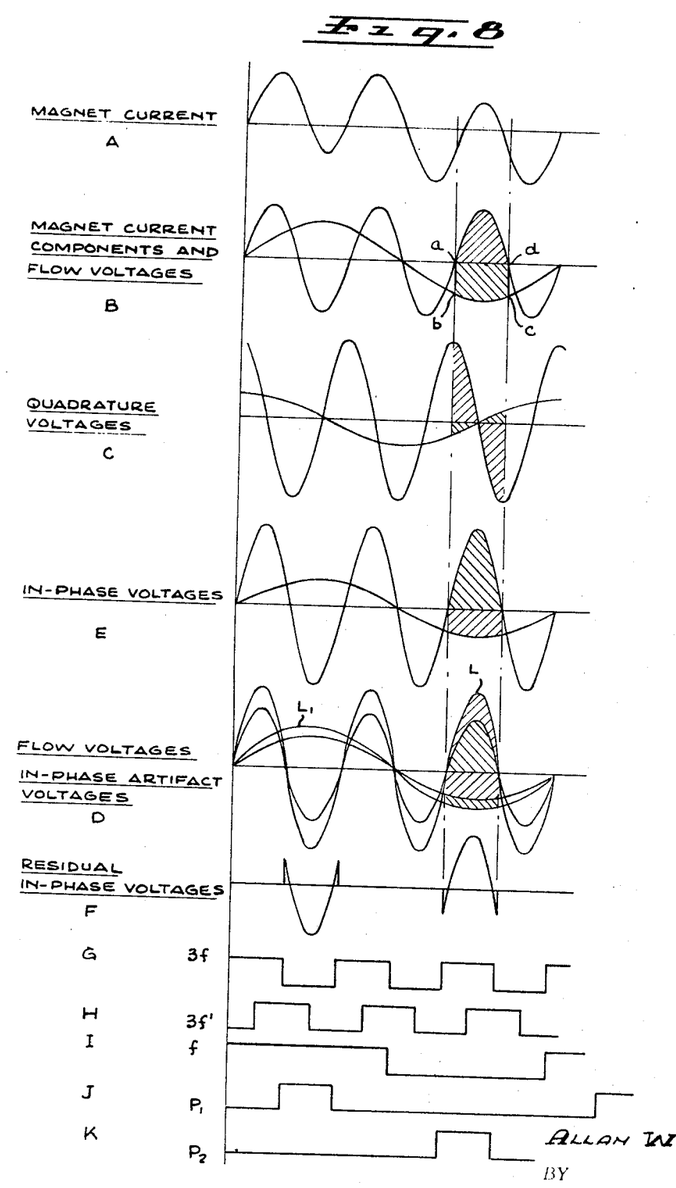
FIG. 8 illustrates the functioning of my invention. The amplitude of the curves represents voltages plotted against phase angle.

The flip-flops 49, 50 and 51 are also connected to the "and" logic circuits 54 and 55, so connected that circuit 54 generates a train of pulses $P_1$ (see J of FIG. 5) whose width is equal to the 0 to $\pi$ width of the third harmonic of the sinusoidal energizing current and whose repetition rate is $f$ (see J of FIG. 8), and which is 180° out of phase with the $3f$ frequency. The logic circuit 55 generates a train of pulses $P_2$ of equal width and repetition rate to the $P_1$ pulses but in phase with the $3f$ frequency (see K of. FIG 8).

These components are each standard components and will not need further description.

As an example and not as a limitation of my invention, the pulse rate from 49 may be 990 pulses per second, and that from 51 may be 330 pulses per second. The circuitry is designed to produce such pulses in a manner which will be understood by those skilled in the art.

The amplitude of the pulses is adjusted, as will be described below, so that the energy in the third harmonic at the interval of 0 to $\pi$ of the third harmonic, is substantially equal to the energy in the fundamental during the 0 to $\pi$ time period of the third harmonic. This is illustrated at B of FIG. 8.

The interval 0 to $\pi$ of the third harmonic contains the area $a$ to $d$ of one-half of the $3f$ frequency cycle. The area $abcd$ of the corresponding portion of the $f$ frequency fundamental is made to be equal, so that in the interval $a$–$d$, i.e., 0 to $\pi$, of the $3f$, the energies cancel out in substantial effect.

Geometrically this is accomplished for a pure sine wave of $f$ and $3f$ frequencies by making the instantaneous maximum voltage or the root mean square voltage of the $f$ wave at 0.67 times that of the $3f$ wave or substantially so. This may also be accomplished in a practical way by an initial adjustment of the voltages of the $f$ and $3f$ pulses passing to the filters 45 and 46, as will be described below.

The signal voltage between 8 and 9 appearing at the input to amplifier 34 in the absence of the adjustment of the resistances 28, 29, 29a and 29b is composed of the signal due to the flow of fluid and to the in-phase eddy current component, induced by the fundamental and the third harmonic (see D of FIG. 8) and also the quadrature voltages (see C of FIG. 8). In D of FIG. 8 the waves of lower amplitude are the flow voltages also shown in B of FIG. 8.

The flow signal is in phase and of an amplitude proportional to the excitation current at frequencies $f$ and $3f$, as shown in B of FIG. 8; and the quadratures resulting from the $f$ and $3f$ frequencies are 90° out of phase (see C of FIG. 8).

It will be noted that these graphs are schematic and illustrative. The magnitudes of the voltages which are illustrated as in phase and in quadrature may be of entirely different proportions than as illustrated.

The 3*f* pulses from 49 are passed through a filter 45, and the *f* pulses from 51 are passed through a filter 46. The resultant sinusoidal current passes through resistors 45*a* and 46*a* and an emitter-follower 44 to the power amplifier and to the electromagnet 3. The form of the energizing voltage is illustrated by A of FIG. 8 and contains the fundamental *f* and the third harmonic 3*f* (see B of FIG. 8).

The relationship of the voltage amplitude fundamental and the third harmonic will be more fully described below.

Reverting the signal appearing at 8 and 9, with switch 65 closed and switches 63 and 64 open, it is fed to the amplifier 34; and the output passes through the high pass filter 35, which passes frequencies *f* and higher, e.g., 3*f*, and blocks noise of lower frequency. The signal passing 35 contains the flow signal, the in-phase component due to the *f* and 3*f* frequencies, and the quadrature voltages as described above and as illustrated in the manner described above.

The voltage passing 35 is sampled by the gate 56, which may be a conventional transistor gate circuit, which is triggered by the logic circuits 54 and 55, by pulses $P_1$ and $P_2$ phased so that one pulse coincides with one-half wave, i.e., the interval 0 to $\pi$ of the 3*f* frequency (see C and D of FIG. 8) and the other pulse with the other half of the 3*f* frequency wave.

As has been explained, the quadrature voltages due to *f* and 3*f* frequencies pass through zero at the center of these intervals and are cancelled out (see C of FIG. 8).

Having adjusted the amplitudes of the *f* and 3*f* frequencies, as described above, and as is further described below, the flow signal, which is not dependent on frequency and is dependent only on the field strength of the magnetic field, will have a wave form, and contains both the *f* and 3*f* harmonic frequencies, for example as illustrated in B of FIG. 8.

The in-phase *f* and 3*f* components are each frequency dependent, so that the amplitude of the 3*f* in-phase component will be greater than that of the *f* frequency in-phase component as shown at L and $L_1$ in D of FIG. 8. The same situation is repeated when the like pulses $P_2$ causes the in-phase component to be sampled by gate 56 during the other half of the cycle of the flow signal.

As is illustrated at B of FIG. 8 the 3*f* and *f* flow voltages components of the signal cancel in the interval of the $P_1$ and $P_2$ pulses. The quadrature components, as is shown at C of FIG. 8 of both the 3*f* and *f* frequencies, pass through 0 at the center of the intervals of the $P_1$ and $P_2$ pulses, and thus cancel out. As has been explained above (see B of FIG. 8) the flow voltage due to the 3*f* component cancels that due to the *f* component. The amplitude of the in-phase component L, due to the 3*f* frequency being substantially higher than that due to the *f* frequency and 180° out of phase, the residual in-phase component is shown at F of FIG. 8. The sample passing through gate 56 contains only the residual in-phase component. It is amplified by amplifier 58 and may be measured at 39 or fed back as will be described below.

The gate 53 is triggered by the emitter-follower 52', energized by the flip-flop 50 at the 3*f'* frequency. The pulse interval 3*f'* (see H of FIG. 8) is centered at a time where the 3*f* signal at 36 passes through zero (see B and D of FIG. 8), but the quadrature due to the 3*f* signal is at a maximum (see C of FIG. 8). The flow signal and the in-phase component cancel out in the interval (see B of FIG. 8) so that only the quadrature component passes through tthe gate 53 to be amplified at 57 and measured at 39*a* or fed back, as will be described below.

The signal passing to the gate 37 contains the quadrature and the in-phase component, as well as the flow signal. Gate 37 is triggered by the emitter-follower 52'', which is connected to the 3*f* flip-flop 49 so that the gate is conductive when the quadrature passes through zero (see C of FIG. 8) and cancels, so that the voltage passing through the gate 37 will contain only the flow signal and its in-phase component. It may be amplified by amplifier 38 measured at 39.

By suitable calibration, the value of the voltage at 39*a* and at 39*b*, multiplied by a suitable factor, may be subtracted from that at 39, to obtain a voltage dependent entirely on the flow and substantially free of the artifact voltages due to eddy currents or quadrature.

I prefer, however, to minimize magnitude of the signals from 57 and 58 and, ideally, to eliminate them, by a feedback to be described below.

In such a manner the signal at 39 will be substantially entirely due to the flow signal, substantially free of the artifact voltages due to the in-phase component and the quadrature voltages described above. This is described below.

As indicated above, I prefer to adjust the voltages of the *f* and 3*f* components so that cancellation results, as is illustrated by B of FIG. 8. During the operation of the unit, switches 63 and 64 are open, and switches 65 and 66 are closed. In order to make the above adjustment, switches 65 and 66 are open and switches 63 and 64 are closed. The composite *f* and 3*f* voltage from the power source is applied directly to the amplifiers 30 and 31. The voltage divider 66 in series with the filter 46 is adjusted until no signal appears at 39, 39*a* and 39*b*.

In this condition the sample taken through the gate 56 is taken at the interval *a–d* of B of FIG. 8, and the lack of a signal at 39*b* indicates that the desired ratio of the amplitudes of the *f* and 3*f* frequencies has been obtained.

By adjusting the relative values of the resistances 28, 29, 29*a* and 29*b*, the artifact voltages reported at the meters 39*a* and 39*b* may be eliminated in substantial effect, and the flow voltage appearing at 39 will be substantially free of the in-phase component and the quadrature voltages.

This may be accomplished by adjusting the position of the taps 8 and 9 (see FIGS. 2 and 6) back and forth until the meters 39*a* and 39*b* show a minimum reading.

The same result may be accomplished by employing the closed loop servosystem shown in FIG. 7.

The lamps 59, 60, 61 and 62, acting conjointly with the light-sensitive resistors 28, 29, 29*a* and 29*b*, function as in the adjustable tap to null out the voltages appearing at 57 and 58, to eliminate from the signal at 39 the artifact, in-phase and quadrature voltages.

Resistors of this type are well known. The lamps 59, 60, 61, 62 are connected between the outputs and the common connection of the differential amplifiers 57 and 58. The light flux from the lamp will depend on the potential levels above the common potential. Thus, the light intensity at 61 will depend on the difference in potential between the output terminal 57*b* and the common connection 57*c*. The light intensity from 62 will depend on the potential difference between the output terminal 57*a* and the common connection 57*c*. The light intensities from the lamp 60 and 59 are likewise dependent on the potential difference between the outputs 58*a* and 58*b* and the common 58*c*.

These lamps illuminate the resistors as described above, and the resistances change in proportion, so as to constitute a negative feedback, to reduce the potentials at the amplifiers 57 and 58 by a servo action, as will be understood by those skilled in this art.

While I have described particular embodiments of my invention for the purpose of illustration, it should be understood that various modifications and adaptations thereof may be made within the spirit of the invention, as set forth in the appended claims.

I claim:

1. A Faraday flow sensor comprising a lumen, a pair of electrodes substantially axially aligned and longitudinally spaced in said lumen and electrically exposed to the interior of said lumen, an additional electrode positioned substantially in the plane of said first-named electrodes and positioned in said lumen on the opposite side of said lumen from said first-named electrodes lying between the pair of electrodes, said additional electrode being electrically exposed to the interior of said lumen; an electromagnetic coil, said coil adapted to generate a magnetic field oriented in a direction substantially perpendicular to the said plane; and means to pass a fluid through said lumen in a direction parallel to the said plane and perpendicular to the said direction of the magnetic field; said pair of electrodes forming a first sensor output terminal and said additional electrode forming the other output terminal.

2. The Faraday flow sensor of claim 1, a pair of resistors, each electrically connected to the said additional electrode, said pair of resistors being electrically connected to each other, an electrical terminal electrically connected to said resistors between the connection of said resistors to said other electrode, and means to adjust the relative value of said resistors.

3. A Faraday flow sensor comprising a lumen, a pair of electrodes substantially axially aligned and longitudinally spaced in said lumen and electrically exposed to the interior of said lumen, an additional electrode positioned substantially in the plane of said first-named electrodes and positioned in said lumen on the opposite side of said lumen from said first-named electrodes, said additional electrode being electrically exposed to the interior of said lumen; an electromagnetic coil, said coil adapted to generate a magnetic field oriented in a direction substantially perpendicular to the said plane; means to pass a fluid through said lumen in a direction parallel to the said plane and perpendicular to the said direction of the magnetic field; and a pair of resistors, each resistor electrically connected to one of said electrodes of said pair of electrodes, said resistors electrically connected to each other, an electrical terminal electrically connected to said pair of resistors between the connection of said resistors to the electrodes, and means to adjust the relative value of the resistances of said pair of resistors.

4. The Faraday flow sensor of claim 3, an additional pair of resistors, each electrically connected to said additional electrode, and said additional resistors electrically connected to each other, an electrical terminal electrically connected to said additional resistors between the connection of said resistors to the said additional electrode, and means to adjust the relative value of the resistances of said additional pair of resistors.

5. The Faraday flow sensor of claim 4, said connection between said additional electrode and the resistors connected thereto consisting of a pair of electrical conductor wires circumambiently positioned about said lumen and spaced from each other longitudinally of the axis of the lumen for a distance greater than the spacing of said first-named pair of electrodes, said electrodes being positioned between said conductors.

6. The Faraday flow meter of claim 5, in which the axial separation of the first pair of electrodes (symbolized by the letter A), and the axial separation of the conductors connected to said additional electrode (symbolized by the letter B), and the internal diameter of the lumen separating the said additional electrodes from said pair of electrodes (symbolized by the letter D) bear a relationship such that B is substantially equal to $$D - \left[\frac{D-2}{2}\right]$$

and A is substantially equal to $$B - \frac{B}{4}$$

all expressed in the same units of length.

7. A Faraday type flowmeter system, said flowmeter including an electromagnetic coil and opposed electrodes positioned in a lumen, means to energize said coil with at least a pair of sinusoidal AC frequencies harmonically related, to generate a composite output signal voltage between said electrodes when a conductive fluid is passed through said lumen, the voltage amplitudes of said harmonic frequencies of said energizing voltage being so related that the integral of the voltage of the frequency during the interval 0 to $\pi$ of the higher harmonic is substantially equal to and opposite in sign to the integral of the coincident period of the wave of the lower frequency, said composite signal containing said harmonic frequencies; means to sample the composite signal containing said harmonic frequencies during said period of said higher harmonic; means to filter the voltage output from the electrodes to remove the lower harmonic component of said composite output signal; and means to isolate a residual signal containing said higher frequency substantially free of lower frequency components.

8. The flowmeter of claim 7, means to sample the higher frequency component of the signal passing said filter during the said period of said higher frequency.

9. The system of claim 7, in which the Faraday flowmeter comprises a lumen, a pair of electrodes substantially axially aligned and longitudinally spaced in said lumen and electrically exposed to the interior of said lumen, an additional electrode positioned substantially in the plane of said first-named electrodes and positioned in said lumen on the opposite side of said lumen from said first-named electrodes, said additional electrode being electrically exposed to the interior of said lumen; an electromagnetic coil, said coil adapted to generate a magnetic field oriented in a direction substantially perpendicular to the said plane; and means to pass a fluid through said lumen in a direction substantially perpendicular to the said plane and to the said direction of the magnetic field; a pair of resistors, each resistor electrically connected to one of said electrodes of said pair of electrodes, said resistors electrically connected to each other, an electrical terminal electrically connected to said pair of resistors between the connection of said resistors to the electrodes, and means to adjust the relative value of the resistances of said pair of resistors; and said means to adjust the relative value of said resistances being responsive to the magnitude of the voltage of said sample to minimize the magnitude of the voltage of said sample.

10. The system of claim 9, means to sample the higher frequency component of the signal passing said filter during said period of said higher frequency.

11. The system of claim 7, in which the Faraday flowmeter comprises a lumen, a pair of electrodes substantially axially aligned and longitudinally spaced in said lumen and electrically exposed to the interior of said lumen, an additional electrode positioned substantially in the plane of said first-named electrodes and positioned in said lumen on the opposite side of said lumen from said first-named electrodes, said additional electrode being electrically exposed to the interior of said lumen; an electromagnetic coil, said coil adapted to generate a magnetic field oriented in a direction perpendicular to the said plane; and means to pass a fluid through said lumen in a direction perpendicular to the said plane and to the said direction of the magnetic field; a pair of resistors, each electrically connected to the said additional electrode, said pair of resistors being electrically connected to each other, an electrical terminal electrically connected to said resistors between the connection of said resistors to said other electrode, and means to adjust the relative value of said resistors; said means to adjust the relative value of said resistances being responsive to the magnitude of the voltage of said sample to minimize the voltage of said sample.

12. The system of claim 7, in which the Faraday flowmeter comprises a lumen, a pair of electrodes substantially axially aligned and longitudinally spaced in said lumen and electrically exposed to the interior of said lumen, an additional electrode positioned substantially in the plane of said first-named electrodes and positioned in said lumen on the opposite side of said lumen from said first-named electrodes, said additional electrode being electrically exposed to the interior of said lumen; an electromagnetic coil, said coil adapted to generate a magnetic field oriented in a direction substantially perpendicular to the said plane; and means to pass a fluid through said lumen in a direction substantially perpendicular to the said plane and to the said direction of the magnetic field; an additional pair of resistors, each electrically connected to the said additional electrode, and said additional resistors electrically connected to each other, an electrical terminal electrically connected to said additional resistors between the connection of said resistors to the said additional electrode, and means to adjust the relative value of the resistances of said additional pair of resistors; said means to adjust the relative resistances connected to said pair of electrodes being responsive to the magnitude of the voltage of the sample taken from the composite signal to minimize the voltage of said sample and said means to adjust the relative resistances connected to said additional example being responsive to the magnitude of the voltage of said sample taken from the higher frequency signal passing through said filter to minimize the magnitude of the voltage of said last-named sample.

13. A Faraday flowmeter comprising (1) a lumen, a pair of electrodes positioned on one side of the lumen and spaced in a line substantially parallel to the axis of said lumen, said electrodes being electrically exposed to the fluid passing through said lumen, a third electrode positioned in the opposite side of said lumen between said electrodes and spaced equally from each of the first-mentioned electrodes, an electromagnetic coil positioned to generate a magnetic field in a direction perpendicular to the spacing of said first-mentioned electrodes and the third electrode, a pair of conductors connected to said third electrode, and passing circumambiently about the lumen, said first pair of electrodes being positioned between said conductors;

(2) means to energize said electromagnetic coil with a multiple frequency sinusoidal current containing a fundamental and a third harmonic frequency, the voltage amplitude of said frequencies being related such that the integrated value of a half wave period of said third harmonic is substantially equal to and opposite in sign to the integrated value of the fundamental over said period;

(3) a differential amplifier, said conductors each being connected to one of the input terminals of said differential amplifier; a pair of photosensitive resistors, each connected to one of the output terminals of said amplifier and to the common terminal of said amplifier;

(4) a third amplifier connected to said pair of conductors;

(5) a fourth amplifier, one input terminal of said fourth amplifier connected to the common terminal of the first amplifier and the other input terminal of the third amplifier connected to the common terminal of the second amplifier;

(6) means to generate a train of square wave pulses at the frequency and in phase with said third harmonic, means to generate a train of square wave pulse at the frequency and in phase with said fundamental; a pair of "and" logic circuits each triggered by the pulses of said fundamental frequency; a gate connected to the output of said fourth amplifier, said gate triggered by the output of said "and" logic circuits, a differential amplifier connected to the output of said gate; a pair of light sources whose light intensity is responsive to an applied voltage, one connected between each output terminal of said last-named amplifier and to the common terminal of said last-named amplifier, one each of said light sources being positioned with respect to one each of said first-named pair of photosensitive resistors connected to said first-named amplifier, so as to illuminate them and adjust the resistance of said resistors responsive to the magnitude of the potential between the output terminals and the common terminal of said first-named amplifier.

14. The Faraday flowmeter of claim 13, a high pass filter connected to the output of said third amplifier to pass the signal from said amplifier substantially free of the fundamental frequency, means to generate a train of square wave pulses at the frequency of but 90° out of phase with said third harmonic frequency, a second gate connected to the output of said filter, said gate triggered by said pulses 90° out of phase with and at the frequency of said third harmonic, the output of said last-named gate connected to a fifth differential amplifier, a pair of light sources whose light intensity is responsive to an applied voltage, one connected between each of the output terminals of the fifth amplifier and the common terminal of said fifth amplifier, said last-named light source being positioned with respect to each of the second-named pair of photosensitive resistors connected to the output of said second-named amplifier, so as to illuminate them and adjust their resistance responsive to the magnitude of the potentials between the input terminals of the fifth amplifier and the common connection of said fifth amplifier; a third gate connected to said high pass filter, said third gate triggered by the first-named pulses in phase with and at the frequency of said third harmonic; and an amplifier connected to the said last-named gate, whereby the output of said last-named amplifier is a periodic signal at a potential substantially free of artifact signals which are in phase with or 90° out of phase with the signal which is responsive to the flow of fluid through said lumen.

References Cited

UNITED STATES PATENTS 3,339,410  9/1967  Stern _______________ 73—194

FOREIGN PATENTS 802,017  9/1958  Great Britain.

OTHER REFERENCES

Eckardt: German app. No. 1,213,132, pub. March 1966.

Westersten et al.: "Gated Sine-Wave Electromagnetic Flowmeter," IRE Transactions on Medical Electronics, December 1959, pp. 213–216.

CHARLES A. RUEHL, *Primary Examiner.*